Feb. 14, 1967 — G. HIRS ETAL — 3,303,932
LEVEL SEEKING SKIMMER
Filed June 27, 1966
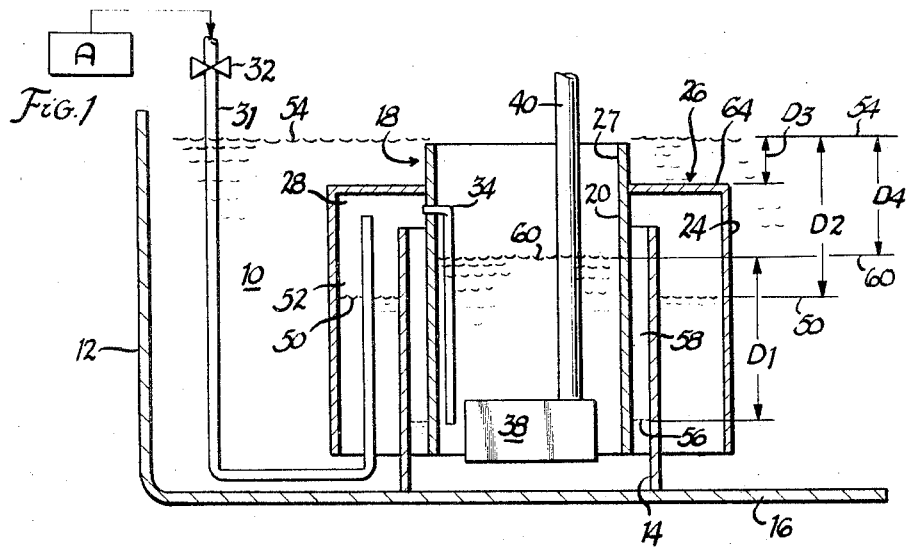
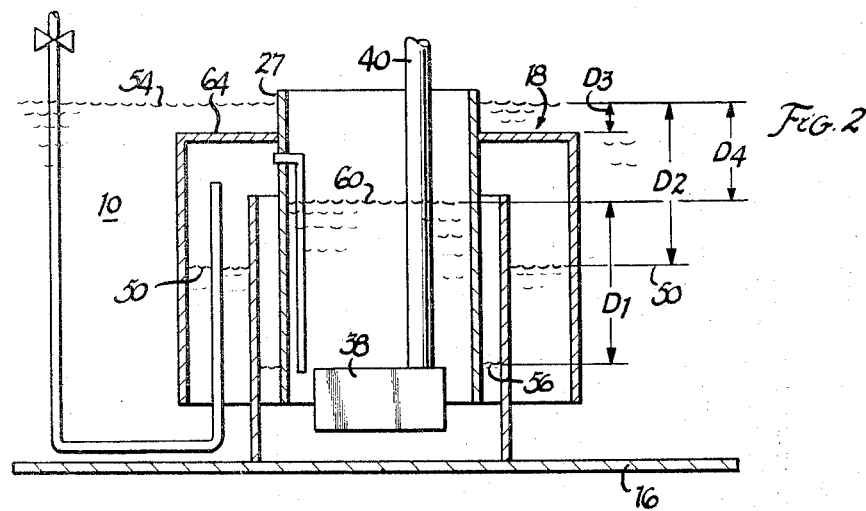
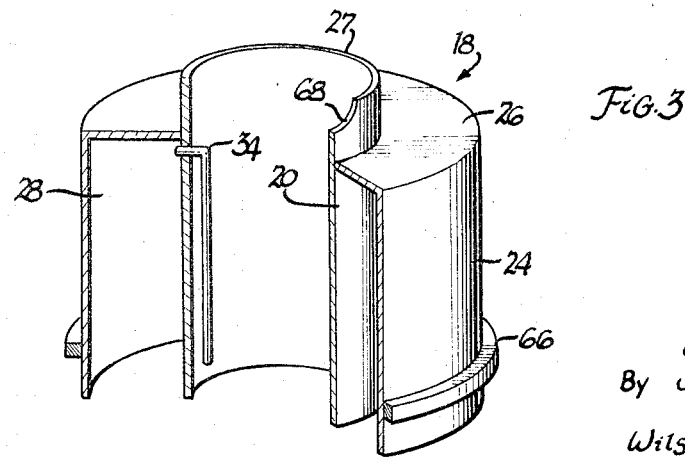
Inventors
GENE HIRS
By JOHN A. NEWMAN
Wilson, Settle, Batchelder
Att'ys. & Craig

United States Patent Office 3,303,932
Patented Feb. 14, 1967

3,303,932
LEVEL SEEKING SKIMMER
Gene Hirs, Birmingham, and John A. Newman, Farmington, Mich., assignors to Hydromation Engineering Company, Livonia, Mich., a corporation of Michigan
Filed June 27, 1966, Ser. No. 560,610
5 Claims. (Cl. 210—65)

This invention relates to methods and apparatus for skimming liquid from the surface of a body of liquid, and more particularly to improvements in skimmers of the type employed to control the flow of clear liquid from settling tanks or the like.

In many filtration systems, the characteristics of the liquid and contaminant particles are such that an efficient separation can be achieved by conducting the contaminated liquid to a settling tank where some or most of the contaminant particles settle to the bottom of the tank. Clear or at least partially clarified liquid can then be drawn from regions at or near the surface of the body of liquid within the settling tank. In the usual case, the liquid so withdrawn from the settling tank is conducted to a secondary or fine filtering apparatus for further separation of the finer or lighter particles. In its simplest form, the settling tank may be provided with an outlet at a relatively high location or one wall of the tank may be lower than the others to permit the liquid to spill over its top. While such an arrangement is satisfactory in many cases, the systems are not adapted to compensate for variations in the rate at which contaminated liquid is supplied to the settling tank or to variations in demand for clear liquid.

Accordingly, it is an object of the present invention to provide methods and apparatus for skimming liquid from a settling tank which will maintain a substantially constant output of clear liquid regardless of variations in the level of liquid contained in the settling tank.

It is another object of the invention to provide methods and apparatus for skimming liquid from a body of liquid contained in the settling tank which are capable of being adjusted and which do not require the connection of relatively movable parts to each other.

In the achievement of the foregoing, and other objects, the present invention employs an annular flotation chamber, open at its botom, and having side walls of substantial vertical extent. Air under pressure is supplied into the interior of the flotation member to regulate its bouyancy. An open topped tubular pump well projects upwardly from the bottom of the settling tank between the inner and outer walls of the flotation member, and a pump is employed to withdraw clear liquid from the pump well. Liquid can flow from the body of liquid over the top of the flotation member when the flotation member is submerged to an extent sufficient to permit such flow. Operation of the pump maintains the level of liquid within the pump well substantially below that of the surface of the body of liquid and the upwardly projecting pump well divides the flotation chamber into two communicating portions, one of which is exposed to the static head of liquid in the pump well and the other of which is exposed to the static head of the body of liquid. Reduction in the level of liquid within the pump well by withdrawal of the liquid by the pump reduces the static head acting against the pressure within the flotation chamber, thereby permitting the flotation member to sink to permit liquid to flow over its top into the pump well. A rise of the level of liquid within the pump well increases the static head acting against the flotation chamber and, in effect, pushes the flotation member upwardly to block the flow of liquid into the pump well. The flotation member will eventually reach an equilibrium position if liquid is withdrawn from the pump well at a steady rate.

Other objects and features of the invention will become apparent by reference to the following specification and to the drawings.

In the drawings:

FIGURE 1 is a partial cross sectional view of one embodiment of the invention showing the skimmer in a position in which water from the surface of the body of liquid is being skimmed into the pump well;

FIGURE 2 is a partial cross sectional view of the structure of FIGURE 1 with the flotation member in an elevated position; and FIGURE 3 is a prespective view showing a cut-away section of the flotation member of the skimmer.

In the embodiment shown in the drawings, a body of liquid 10 to be skimmed is contained within a settling tank 12. At some point within tank 12, a generally cylindrical pump well 14 is sealed to the bottom 16 of tank 12 and projects upwardly from bottom 16 to a position well below the normal level of liquid contained in tank 10. A flotation member designated generally 18 is formed with an inner cylindrical wall 20 and a concentric outer wall 24 with an annular cover member 26 fixedly secured to the inner and outer walls 20 and 24 to close the annular space between the upper end portions of the two walls. Preferably, inner wall 20 is projected upwardly above cover member 26 as at 27 to define a weir. The disclosed construction thus forms an annular open bottomed flotation chamber 28 whose bouyancy can be regulated, if desired, by varying the pressure of air trapped in chamber 28. Inner wall 20 of flotation member 18 projects downwardly into the interior of pump well 14, while outer wall 24 is spaced outwardly from the exterior of the pump well. Air under pressure can be supplied to flotation chamber 28 from a supply schematically illustrated at A via a conduit 31 controlled by a valve 32. Air under pressure can be vented from chamber 28 by means of a vent pipe 34 whose lower end is maintained at a substantial distance below the level of liquid within pump well 14 to thereby provide a static head pressure resisting the flow of air from chamber 28 through vent pipe 34. Liquid is withdrawn from pump well 14 by a pump 38 disposed within the pump well and having an outlet conduit 40 through which the liquid is pumped by pump 38 to the desired location.

Depending upon the magnitude of the pressure within flotation chamber 28, flotation member 18 will float at a level determined by the mass of the member, the effective area of cover plate 26 and the pressure within chamber 28. The level of liquid 50 within that portion 52 of chamber 28 at the outer side of pump well 14 is determined by the static head existing due to the difference in level D2 between the surface 54 of the body of liquid 10 and level 50. It will be noted that level 50 is substantially different than the level 56 of liquid within that portion 58 of chamber 28 located between pump well 14 and the inner wall 20 of flotation member 18 This difference occurs because of the difference in static head D4 between the surface level of the body of liquid in tank 12 and the level 60 of liquid within pump well 14. Since the pressure acting downwardly at levels 50 and 56 is the same—i.e. the pressure within chamber 28, the static heads D1 and D2 are normally exactly equal to each other. The differences in level D3 and D4 are in turn dependent upon each other and variable, D3 being representative of the level at which flotation member 18 floats, while D4 being the difference in level between the surface of the body of liquid 54 and the level 60 within pump well 14.

Operation of the skimmer is as follows. Assuming that the device is operating in a settling tank from which clear liquid is to be skimmed from the body of liquid 10 into pump well 14 for subsequent withdrawal by pump 38, the level of liquid 60 within pump well 14 is determined directly by operation of pump 38 since liquid withdrawn from the pump well by pump 38 lowers level 60.

Lowering of level 60 decreases the static head D1 above liquid in the flotation chamber portion 58, thereby permitting the substantially constant pressure in chamber 28 to drive level 56 downwardly. Dropping of the level 56 has a tendency to increase the volume of air space within chamber 28, however this increase in volume is substantially immediately compensated for by a corresponding rise of the level 50. However, the system is in equilibrium only when the static head D2 forcing liquid level 50 upwrdly into chamber portion 52 of the flotation chamber is at the magnitude indicated in FIGURES 1 and 2 and hence the "rise" of level 50 is a relative movement, and rather than elevating the level, flotation chamber 18 sinks. As the chamber sinks, the upper edge of weir 27 drops below the surface of the body of liquid 10 as indicated in FIGURE 1 and liquid from the main body of liquid spills over the top of weir 27 into the pump well to raise level 60.

Because of the substantial difference in cross sectional area between the respective portions 52 and 58 of flotation chamber 28, the amount of vertical movement of the flotation chamber is only a fractional amount of the variation in level 60, the vertical displacement of flotation chamber 18 being equal to the vertical displacement of level 60 multiplied by a fractional value equal to the cross sectional area of chamber 58 over the cross sectional area of chamber 52. As the level 60 increases, it applies an increased head pressure upwardly at level 56, thereby tending to make level 56 rise. This in effect acts to increase the pressure in chamber 28, thereby tending to force level 50 downwardly. However, level 50 remains substantially constant and the increased pressure acts to increase the buoyancy of flotation member 18, thereby raising the member until weir 27 projects above the surface of the liquid as illustrated in FIGURE 2.

The flotation member will reach an equilibrium position if pump 38 withdraws liquid at a constant rate, the equilibrium position permitting a rate of flow of liquid into the pump well equal to the rate of which it is being withdrawn. This equilibrium position is one which is relative to the surface level of the body of liquid and is not disturbed by variations of the level of liquid in tank 12.

The static head in the pump well above the pump intake is initially adjusted by adjusting the pressure of air within chamber 28. In one method of operation, the chamber can be charged to a preselected pressure and vent 34 may, if desired, be blocked to seal the charge of air in chamber 28.

However, it is preferable to supply air under pressure continuously to chamber 28 and to continuously vent the chamber through vent conduit 34. The rate at which air is vented from conduit 34 is determined by the back pressure exerted into conduit 34 by the static head of liquid within the pump well above the open lower end of the vent 34. It is believed apparent that variations in level 60 act to vary the internal pressure within chamber 28 to assist in raising and lowering the float member in accordance with the method of operation described above. For example, assuming a sudden drop in level 60, the back pressure exerted on the lower end of vent 34 would be substantially reduced, thereby permitting chamber 28 to vent more rapidly. This would decrease the pressure within chamber 28, thereby reducing the buoyancy of float member 18 to lower the assembly.

If desired, flotation member 18 may be provided with a weight ring 66 of any desired weight, and if desired, weir 27 may be provided with a suitable notch 68 to achieve a more regulated flow of liquid into the pump well and is possible where liquid is permitted to spill in over the entire periphery of the weir.

We claim:
1. Apparatus for skimming liquid from the surface of a body of liquid comprising a flotation member having downwardly projecting concentric inner and outer tubular walls joined to each other adjacent their upper ends by a cover plate to define an annular open bottomed flotation chamber in said member, a tubular pump well projecting upwardly from the bottom of said body of liquid into the space between said inner and outer tubular walls in concentric spaced relationship therewith, pump means for withdrawing liquid from said pump well, weir means on the upper end of said flotation member for blocking flow of liquid from said body of liquid over said flotation member into said pump well when the level of liquid within said inner tubular member is above a selected level, and means for introducing air under pressure into said flotation chamber to establish the buoyancy of said flotation member to locate said weir means flush with the surface of said body of liquid when the level of liquid within said inner tubular member is at a selected level below said surface.

2. Apparatus as defined in claim 1 wherein said pump well divides said flotation chamber into a first chamber portion between said well and said outer wall and a second chamber portion between said well and said inner wall, said chamber portions being in free and open communication with each other, said first chamber portion having a substantially greater horizontal cross sectional area than said second chamber portion.

3. Apparatus as defined in claim 1 wherein said means for introducing air into said flotation chamber to establish the buoyancy of said flotation member comprises a supply of air under pressure, conduit means connecting said supply to said flotation chamber, and a vent conduit for venting air from said chamber into said pump well below the level of liquid therein.

4. The method of skimming liquid from the surface of a body of liquid comprising the steps of establishing a pump well within said body of liquid wherein the liquid level may be maintained at a substantially lower level than the surface of said body of liquid, isolating the pump well from the body of liquid with a flotation chamber having a first chamber portion exposed to the static head of liquid in said pump well and and a second chamber portion in direct communication with said first chamber portion and exposed to the static head of liquid in said body of liquid, maintaining a substantially constant pressure in said flotation chamber to maintain said chamber at a selected depth in said body of liquid when the level of liquid in said pump well is at a preselected level, and controlling flow from said body of liquid into said pump well over the top of said flotation chamber by varying the depth of said flotation chamber in accordance with the level of liquid in said pump well.

5. The method defined in claim 4 wherein the step of maintaining a substantially constant pressure in said flotation chamber comprises the steps of continuously supplying air under pressure to said chamber, and continuously venting air from said chamber into said pump well at a location below the level of liquid therein.

No references cited.

REUBEN FRIEDMAN, *Primary Examiner.*
S. ZAHARNA, *Assistant Examiner.*